Fig.1

Inventors
Frank C. Choice
Raymond D. E. Eldred
Gordon C. J. Wakefield
By their Attorney June 22, 1965     F. C. CHOICE ETAL     3,189,943
MACHINE FOR VULCANIZING SOLES ONTO SHOE BOTTOMS

Fig. 6

3,189,943
MACHINE FOR VULCANIZING SOLES ONTO
SHOE BOTTOMS
Frank Coleman Choice, Raymond Derek Edwin Eldred, and Gordon Cecil John Wakefield, Leicester, England, assignors to United Shoe Machinery Corporation, Flemington, N.J., a corporation of New Jersey
Filed Mar. 6, 1962, Ser. No. 177,857
Claims priority, application Great Britain, Mar. 18, 1961, 9,964/61
6 Claims. (Cl. 18—17)

This invention relates to molding machines and is herein illustrated in its application to machines for molding and attaching outsoles to shoe bottoms and curing or vulcanizing the outsole substance. A machine of this type is disclosed in United States Letters Patent No. 2,922,191, granted January 26, 1960, on an application filed in the name of George C. Barton. It is to be understood, however, that the invention is not limited to machines which perform both a molding and a curing or vulcanizing operation but is applicable to molding machines generally.

It is an object of the present invention to provide an improved machine of the type illustrated in the Barton patent above referred to which is more economical and more efficient in its operation than the Barton machine and which produces work of a more acceptable quality.

With the above and other objects in view as will hereinafter appear, the present invention, in one aspect thereof, contemplates the provision in a machine for molding soles onto shoe bottoms of an improved means for mounting the shoe form comprising a cylinder having mechanical connections for supporting the shoe form in its retracted position and a first piston for elevating the cylinder and the shoe form. In order to provide for an initial and controlled downward movement of the shoe form while the upward pressure of the first piston against the cylinder is maintained, a cam roll is mounted on the cylinder and arranged to engage a cam slide which limits upward movement of the cylinder by the first piston, and means is provided for operating the cam slide to impart downward movement to the cylinder and through the cylinder to the shoe form. In the illustrated organization the cam slide is operated by the same mechanism which imparts closing movement to the side mold members. In accordance with a further feature of the invention, at least a part of the downward movement applied by the cam member to the shoe form occurs while welt plates incorporated in the side mold members are in contact with a lasted shoe upper on the shoe form so that the upper is upwiped by the movement of the shoe form relatively to the welt plates thereby to bring the insole to which the upper is lasted into contiguous relation to the sole face of the shoe form throughout its entire extent.

In order to insure a proper disposition of a charge of moldable material on the bottom mold member, the illustrated machine is provided with means cooperating with the bottom mold member to contain the charge and confine it to the area of the charge supoprting surface of the bottom mold member. Said containing means is operative only when the bottom mold member is in its retracted position, said containing means remaining stationary while the bottom mold member advances to press the charge against the shoe bottom.

These and other features of the invention will now be described with reference to the accompanying drawings and pointed out in the appended claims.

The invention is herein illustrated as embodied in a machine of the type illustrated in the Barton patent hereinbefore referred to.

Figure 1:
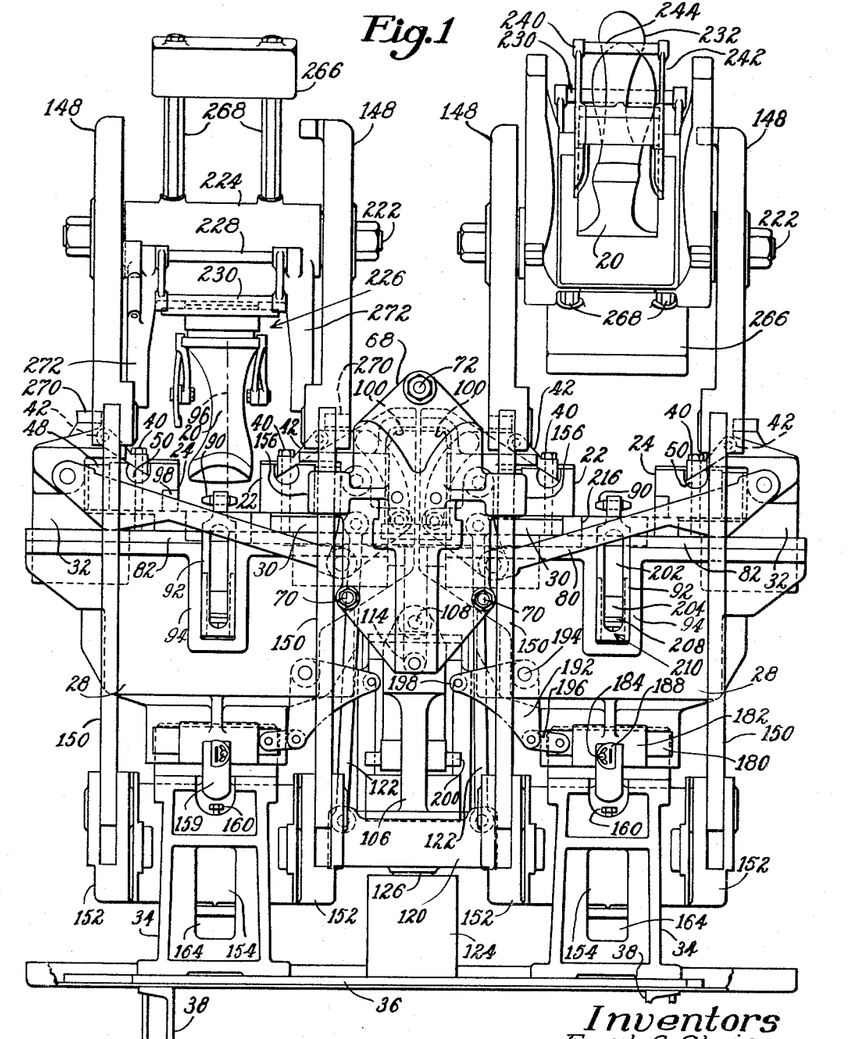
FIG. 1 is a front elevation illustrating a two station machine embodying the features of the present invention.

Referring to FIG. 1, there is provided in each station of the machine a shoe form 20 constructed and arranged to receive a lasted shoe onto which a sole is to be vulcanized. For molding a sole onto the shoe bottom there is provided in each station a pair of side molds comprising an inner mold member 22 and an outer mold member 24 arranged to close against each other and against a shoe mounted on a shoe form in the mold charging station as shown at the left in FIG. 1. Arranged to cooperate with the side mold members is a bottom mold member 26 (FIG. 3) which receives a charge in the form of a generally sole-shaped biscuit of unvulcanized soling material. The sole mold member is mounted for upward movement between the side mold members thereby to mold and vulcanize the charge against the bottom of a lasted shoe mounted on the shoe form. The means hereinafter described for mounting the bottom mold member extends downwardly into a hollow frame 28 and the side walls of the frame provide support for a carrier 30 for the inner side mold member 22 and a carrier 32 for the outer side mold member 24. Each frame 28 is supported on two standards 34, one in the front and one in the rear of the machine. The standards rest on and are secured to a base plate 36 which in turn is supported on horizontal channel members 38.

Figure 3:
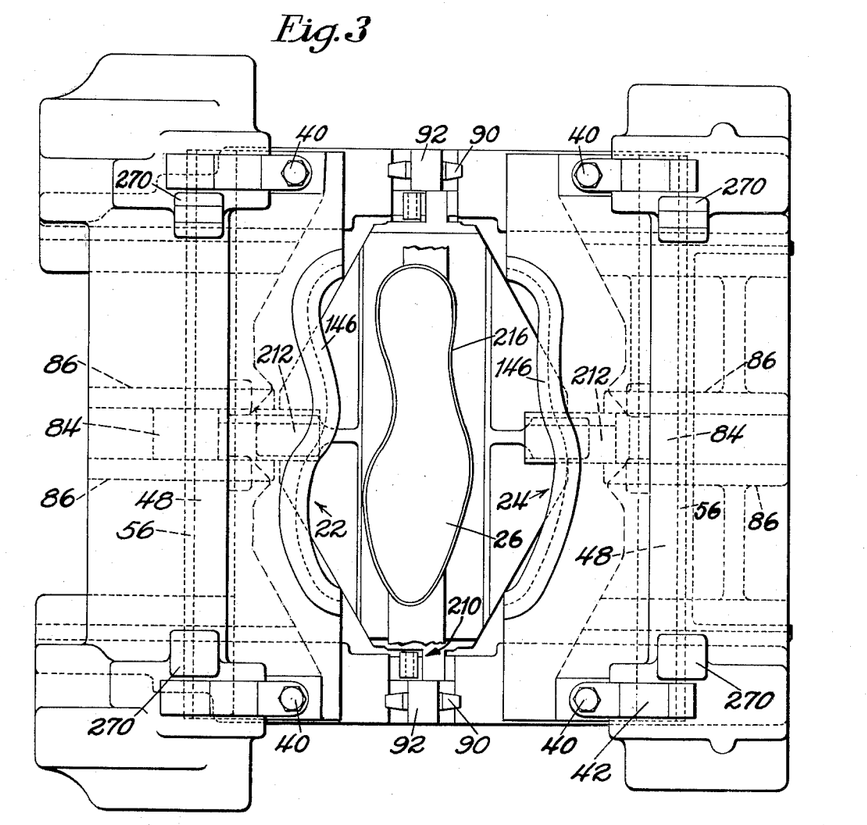
FIG. 3 is a plan view of the right hand station of the machine drawn on a somewhat larger scale than FIGS. 1 and 2.
Figure 5:
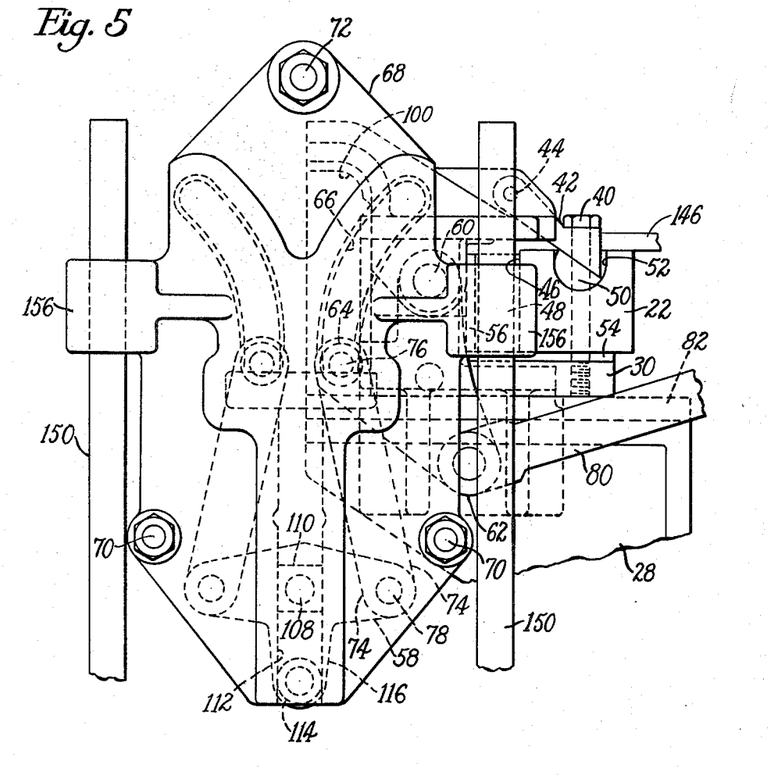
FIG. 5 is an enlarged view in front elevation illustrating parts of the side mold closing mechanism.

Referring to FIG. 3, each side mold member is secured to its carrier by two bolts 40, one in the front and one in the rear of the mold assembly. Referring to FIG. 5, each bolt 40 is rotatably mounted in the free end portion of a swinging arm 42 pivotally mounted at 44 in an upward extension of the side mold carrier, the arms being so arranged that they may readily swing outwardly with the bolts mounted therein to facilitate the removal of the side mold members. Each side mold member is arranged with its outer rectilinear edge face in contiguous relation to a heater block 48 mounted on the mold carrier. There is interposed between the arm 42 and the side mold member a semicylindrical spacer member 50 arranged to be freely mounted in a complementally shaped recess 52 in the side mold member. The plane surface of the spacer member is arranged at an angle as shown in FIG. 5 so as to receive in contiguous relation the bottom surface of the arm 42, and the spacer member is vertically bored to receive the bolt 40. Interposed between the side mold member and its carrier and secured therebetween by the bolts 40 is an insulating plate 54. The plate 54 together with a vertically disposed insulating plate 56 insulate the side mold member and its heating element from the mold carrier.

Figure 2:
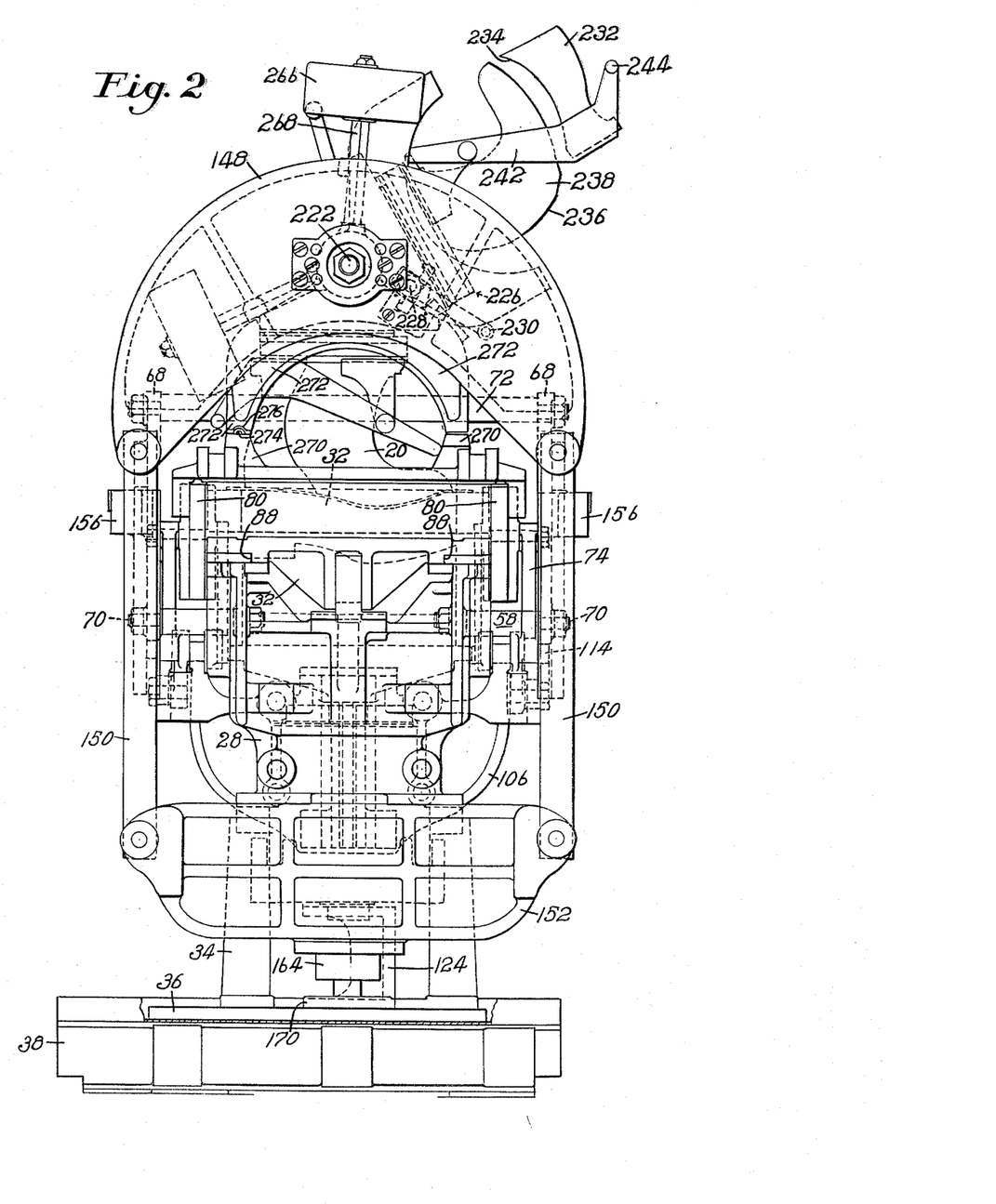
FIG. 2 is a left side elevation.

For concomitantly closing the side mold members in the two stations of the machine, two yokes are provided, one of said yokes being illustrated in FIG. 5 and identified by the numeral 58. The two yokes are centrally located widthwise of the machine, one being located in the front and the other in the rear as shown in FIG. 2. The yokes are moved upwardly by means hereinafter described and operate through four duplicate linkages to impart closing movements to the side mold members in both stations of the machine. It will be understood that the following description of the forward linkage in the right-hand station applies equally well to the other three linkages. Pivotally mounted by means of a pin 60 on the inner side mold carried 30 is a cam member in the form of a generally triangular plate 62. Said cam plate carries a roll 64 which moves endwise of a cam slot 66 extending arcuately upwardly and laterally in a standard 68 secured by bolts 70 to the forward portions of the hollow frame members 28. The upper portion of the standard is rigidly braced by a tie rod 72 connecting the standard 68 to a similar standard at the rear of the machine. The cam plate 62 is connected to the yoke 58 by a link 74, the upper end of which is pivotally mounted on a pin 76 which carries the cam roll 64 and the lower end to a pin 78 in the right end portion of the yoke. For closing the outer side mold member 24 a link 80 connects the cam plate 62 to the outer mold carrier 32. The link is so disposed relatively to the cam plate that the mold carrier 32 advances the outer mold member 24 at the required rate of movement so that the side mold members come into engagement with the bottom mold member simultaneously to form the mold cavity.

For positively locating the side mold members relatively to each other the mold carriers 30 and 32 are guided for sliding movement on rails 82 by blocks 84 (FIG. 3) fixed to the frame 28 and embraced by depending bifurcated portions 86 of the side mold carriers 30 and 32. To hold the side mold carriers against upward movement, the rails 82 are arranged to be received in channels 88 (FIG. 2) formed in the mold carriers. For positively locating the side mold members relatively to each other in their closed position the mold members closed on tapered end portions of cross pins 90 (FIG. 3) positioned at opposite end portions of the side mold members. Referring to FIG. 1, each cross pin is mounted in and extends laterally in opposite directions from the reduced upper end portion of an arm 92 pivotally mounted for limited forward and rearward swinging movement between the walls of a depending channel structure 94 formed in the frame 28. Such movement of the arms 92 accommodates the lengthwise expansion of the side mold members when they are heated to vulcanizing temperature by the heater blocks 48. To provide for vertical adjustment of the cross pins 90 the arms 92 are pivotally mounted on eccentric pins (not shown) adjustably mounted in the channel structure 94.

Referring to FIG. 1, the shoe form 20 in the left station is shown slightly above its mold charging station and a vertical dot dash line is inscribed on the shoe form to indicate the vertical plane at which the side mold members meet in their closed position. Inasmuch as the arm 92 is offset to the left from the meeting plane, the outer side mold member 24 is recessed at 98 to permit movement of the mold member relatively to the arm 92 into its closed position. It will be seen that the greater part of the shoe form 20 extends to the left from the line 96 making it desirable for the outer side mold member 24 to retract to an open position at a greater distance from the line 96 than the inner side mold member 22. The illustrated side mold closing mechanism is constructed to effect the desired degree of movement of each side mold member and to cause the mold members to meet in their closed position at the plane defined by the line 96. In the event that the side mold carriers 30 and 32 are moved inwardly with no mold members mounted thereon, such inward movement is limited by the engagement of the cam plate 62 with a curved surface 100 (FIG. 5) formed in an extension of the inner side mold carrier 30.

The side mold members are closed by the upward movement of the yoke 58 effected by pressurizing a cylinder 102 (FIG. 4) to cause it to move vertically upwardly relatively to a fixed piston 104. The cylinder has forwardly and rearwardly extending wings 106 (FIG. 2) and the forwardly extending wing has mounted therein and extending forwardly therefrom a pin 108 (FIG. 4) which extends through the hub of the yoke 58 and mounts at its forward extremity a block 110 which travels vertically in a groove 112 in the standard 68 and thus serves as a guide for the vertical movement of the yoke. The yoke is maintained in a horizontal position by a roll 114 mounted at the lower extremity of a depending arm 116 of the yoke and arranged to travel in the groove 112. The movement of the cylinder 102 is directed by flanges 118 projecting outwardly from the cylinder and engaging vertical ribs formed in the frame 28. The piston 104 is supported by a cradle 120 suspended between the frames 28 on the lower ends of rods 122, the upper ends of which are pivotally connected to the mold carriers 30. The cradle is restrained against sideways movement by a standard 124 fixed to the base plate 36 and having a central bore which receives a cylindrical boss 126 depending from the cradle. The piston 104 is fixed to the upper end portion of a rod 128 which extends downwardly through the cylinder 102 and is supported by the base of a counterbore 130 formed in the cradle 120. A lower portion 132 of the piston rod of reduced diameter extends downwardly through the cradle 120 and is threaded to receive nuts 134 which secured the piston rod to the cradle.

In order to raise the cylinder 102 to effect the closing of the side mold members 22 and 24, pressure fluid is conducted into the upper portion of the cylinder through a port in an upper end cap 136 while fluid is exhausted from the lower portion of the cylinder through radial ports 138 formed in the piston rod 128 and communicating with an axial bore 139 extending downwardly from the ports 138 to the lower end portion of the piston rod where it communicates with a bore formed in a block 143 secured by a clamping nut 145 to the reduced lower end portion of the piston rod. The upward movement of the cylinder is imparted to the side mold carriers 30 and 32 through the connections above described. To facilitate the assembling and disassembling of the cylinder assembly, there is provided a removable cylindrical liner member 140 in which is mounted an oil seal 142 through which the piston rod 128 extends. At its upper end the liner member 140 is attached to the end cap 136 and the lower end of the liner engages an end cap 144 fixed to the lower end of the cylinder 102. Thus it will be seen that after disconnecting the pipe lines communicating with the piston and cylinder assembly, removing the nuts 134 and 145 and releasing the upper end cap 136 from the cylinder 102, the end cap together with the liner member 140, the oil seal 142, and the piston assembly may be withdrawn upwardly out of the machine.

The side mold members 22 and 24 have incorporated therein welt plates 146 (FIG. 3), the inner edges of which engage and penetrate the outer surface of a shoe in the mold charging station when the side mold members are advanced into their closed positions. Preferably the welt plates engage the outer surface of the upper along a line registering substantially with the center of the thickness of the insole to which the shoe has been lasted and the welt plate is shaped to the periphery of the feather line portion of the shoe so that in the closed position of the side mold members the welt plates provide a complete seal extending along the feather line portion of the shoe and thus preventing spewing of the charge in the mold cavity during the sole vulcanizing operation.

In the illustrated organization the shoe form 20 is automatically advanced into the mold charging station concomitantly with the advancement of the side mold members into their closed position, the closing sequence being generally similar to a sequence described in United States Letters Patent No. 2,956,313, granted October 18, 1960 on an application filed in the name of Frank C. Choice.

Each shoe form 20 is pivotally supported as hereinafter described by inner and outer side frames 148. As shown in FIG. 2, each side frame is generally crescent shaped and extends forwardly and rearwardly of the machine in overarching relation to a shoe form 20 depending therefrom. At its forward and rearward end portions each side frame is supported on the upper ends of vertical shafts 150. At their lower ends the shafts 150 are pivotally connected to opposite end portions of a composite cross head 152, there being two such cross heads in each station of the machine. The two cross heads are secured at opposite sides of a cylinder 154 (FIG. 1) positioned between the standards 34, the arrangement being such that the cross heads 152 are positioned at opposite sides of the standards 34. The inner shafts 150 are restrained against vertical movement by guide members 156 on the standards 68, said guide members being arranged in embracing relation to the shafts 150.

Figure 6:
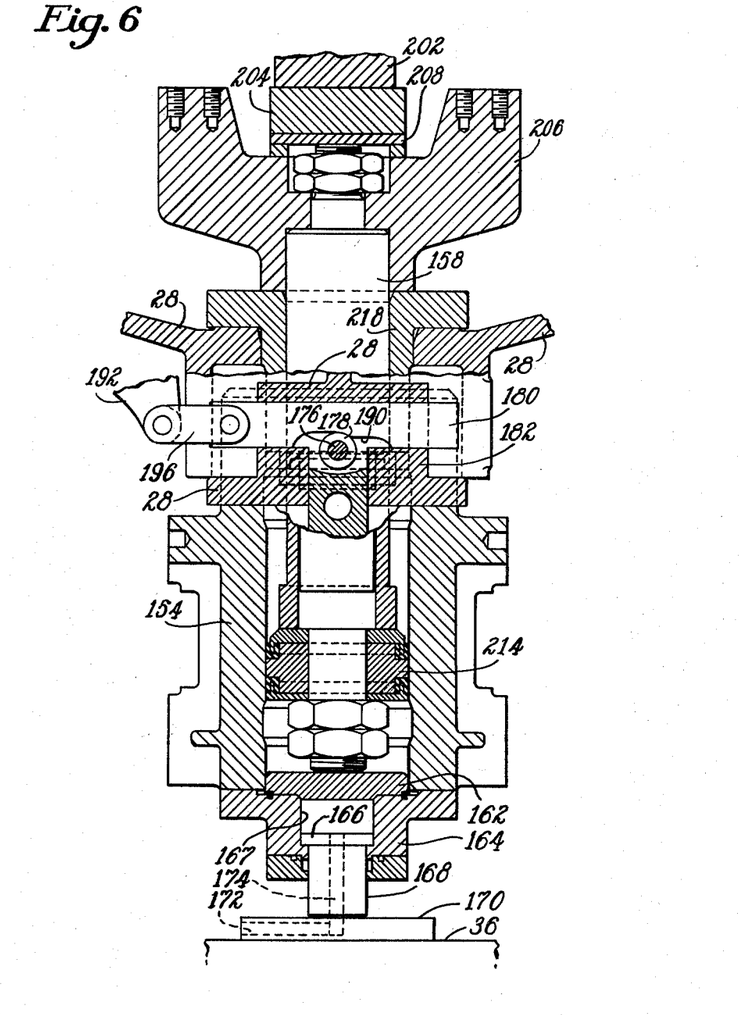
FIG. 6 is an enlarged vertical section taken on a plane extending widthwise of the machine through the axis of the bottom mold cylinder.

Mounted in the cylinders 154 for vertical movement are pistons or rams 158 (FIG. 4) which extend upwardly through the frames 28 and support the bottom mold members 26. When there is no pressure in the hydraulic system the cylinders 154 are supported in their lowermost positions by the engagement of lugs 159 (FIG. 1) projecting from said cylinders with stop screws 160 mounted on the standards 34. When the hydraulic system is pressurized the cylinders 154 are raised, thus elevating the side frames 148 and the shoe forms 20 supported thereby. The upward movement of the cylinders, which is approximately 9/32 of an inch, positions the shoe forms for manual movement between loading stations hereinafter described and downwardly depending positions in intermediate stations in which they register with the mold members but are positioned above their mold charging stations. As shown in FIG. 6, the cylinders 154 are bored to receive the rams 158, said bores being sealed at their lower ends by plates 162. Each cylinder 154 has at its lower end a cap 164 which is bored coaxially with the bore in the cylinder to receive a stationary piston 166 having a stem 168 extending through the lower portion of the cap 164 to a base member 170 fixed to the base plate 36. Pressure fluid flows through a horizontal bore 172 in the base member 170, said bore communicating with an axial bore 174 in the piston 166 to provide for the pressurizing of a chamber 167 in the cap 164 thereby to elevate the cylinder 154 into its position illustrated in FIG. 6.

Figure 4:
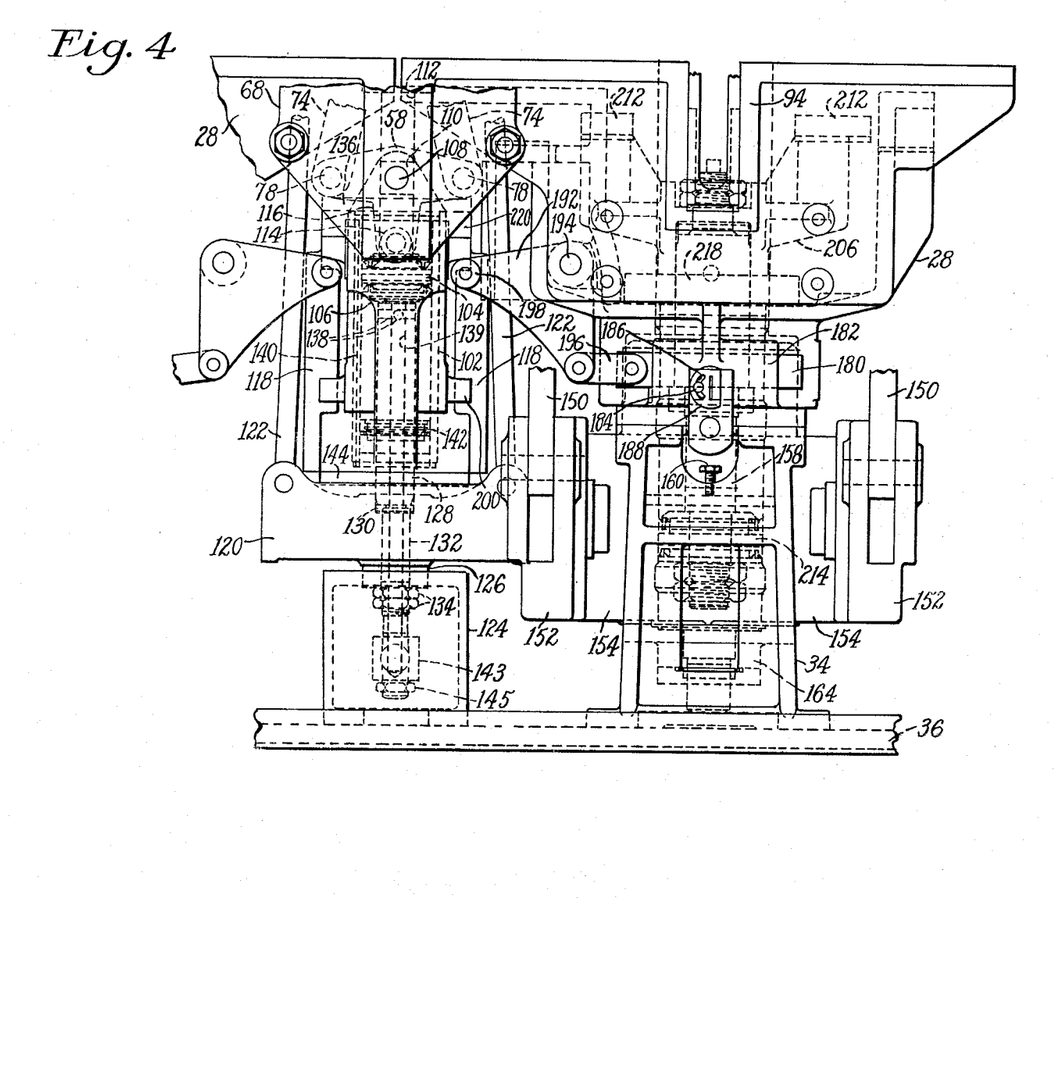
FIG. 4 is a front elevation of the lower portion of the right hand station of the machine.

During the upward movement of the cylinder 102 (FIG. 4) to close the side mold members 22 and 24 as hereinbefore described, the shoe forms 20, which have been swung downwardly into their intermediate stations, are moved downwardly by means now to be described. Carried on two eccentric pins 176 mounted, respectively, in forward and rearward portions of each cylinder 154 are cam rolls 178 (FIG. 6) arranged to bear against cam slides 180 mounted for lateral sliding movement in bearings formed in depending portions 182 of the frame 28. To provide for vertical adjustment of each roll 178, the pin 176 is adjustable by rotation in its bearing in the cylinder and is secured in adjusted position by a clamping screw 184 (FIG. 4) extending through an arcuate slot 186 formed in the head 188 of the pin 176. When each cylinder 154 is elevated, as hereinbefore described, each cam roll engages a cam face 190 formed in the slide 180 to determine the elevated position of the shoe form. During the closing movement of the side mold members, the cam slide 180 is moved to the left as seen in FIG. 6 to impart downward movement to the cylinder 154, against the upward thrust of pressure fluid exerted against the plate 162, thereby to cause the shoe form to move downwardly from its intermediate station. In the illustrated organization such movement of the cam slide is effected by the operation of a bell crank lever 192. Referring to FIG. 4, the bell crank lever is fulcrumed at 194 on the frame 28 and is connected by a link 196 to the cam slide. The inwardly extending portion of the bell crank lever is bifurcated to mount a roll 198. During the upward movement of the cylinder 102 a lug 200 projecting outwardly from the cylinder 102 engages the roll 198 and swings the bell crank lever 192 in a direction to move the cam slide 180 to the left as seen in FIG. 6, thus causing the downward movement of the shoe form as above described. The operation of the slide 180 leaves the shoe form still slightly elevated above its mold charging station. The final movement of the shoe form downwardly into its station position occurs when fluid pressure upwardly against the plate 162 is relieved permitting downward movement of the cylinder into a position determined by means hereinafter described.

Each bottom mold member 26 is assembled on a support block, the reduced forward end portion of which is shown in FIG. 1 and identified by the numeral 202. The illustrated forward end portion is inserted between the walls of the channel structure 94. The bottom mold member, together with the support block, are removable as a unit to permit substitution of another bottom mold member and support block of a different size or style. The support block is mounted on a heater unit 204 supported on a carrier member 206 secured to the upper end portion of the ram 158, the heater block being insulated from the carrier member by an insulating plate 208. To provide for the accurate location of the bottom mold member relatively to the side mold members, the carrier plate 206 is provided at its opposite ends with guiding means 210 (FIG. 3) arranged to engage a side wall of the channel structure 94, and guide blocks 212 (FIGS. 3 and 4) position the bottom mold member endwise thereof by engagement with the walls of the bifurcations 86 in the carriers 30 and 32 which mount the side mold members. The guide blocks 212 are movable away from each other to take up any undesirable play between the guide blocks and their supporting structures, and each arm 92 (FIG. 3) is adjustable on its pivot pin in the direction of the width of the bottom mold member relatively to the walls of the bifurcations in the frame 28 in which it is mounted.

In order to raise the ram 158, pressure fluid in the lower portion of the cylinder 154 imparts upward movement to a double acting piston 214 (FIG. 6) mounted in said cylinder and fixed to the ram 158. Upward movement of the ram carries the bottom mold member 26 through containers 216 (FIGS. 1 and 3), hereinafter described, supported by the forward and rearward walls of the frame member 28 and positioned between the side mold members 22 and 24. Preferably, the hydraulic control means of the machine is set to cause an initial period of low pressure of the ram 158 against the bottom mold member followed by a second period of relatively high pressure. At the end of the second period, pressure fluid acts on the piston 214 to move the ram 158 downwardly, fluid beneath the piston being exhausted to permit the ram 158 to move downwardly into engagement with members 218 secured to the frame 28. Simultaneously, pressure fluid acts on the piston 104 to cause the cylinder 102 to move downwardly, thereby to open the side mold members 22 and 24. The opening of the side mold members is delayed until upward pressure of the vulcanized sole against the welt plates 146 is reduced by downward movement of the bottom mold member 26. Thereupon pressure is relieved above the piston 104 and the cylinder 130 is pressurized. After the side mold members 22 and 24 have moved clear of the vulcanized sole, a lug 220 projecting outwardly from the cylinder 102 and spaced above the lug 200 engages the roll 198 to swing the bell crank lever 192 downwardly thereby to move the cam slide 180 to the right as seen in FIG. 4, thereby releasing the roll 178 (FIG. 6) for limited upward movement. Thereupon the cylinder 154 is moved upwardly by fluid pressure, thus elevating the shoe form to its intermediate station. During the downward movement of the cylinder 102 a spring (not shown) holds the bell crank lever 192 stationary, thus preventing upward movement of the shoe form before the side mold members are fully retracted.

Figures 7, 8:
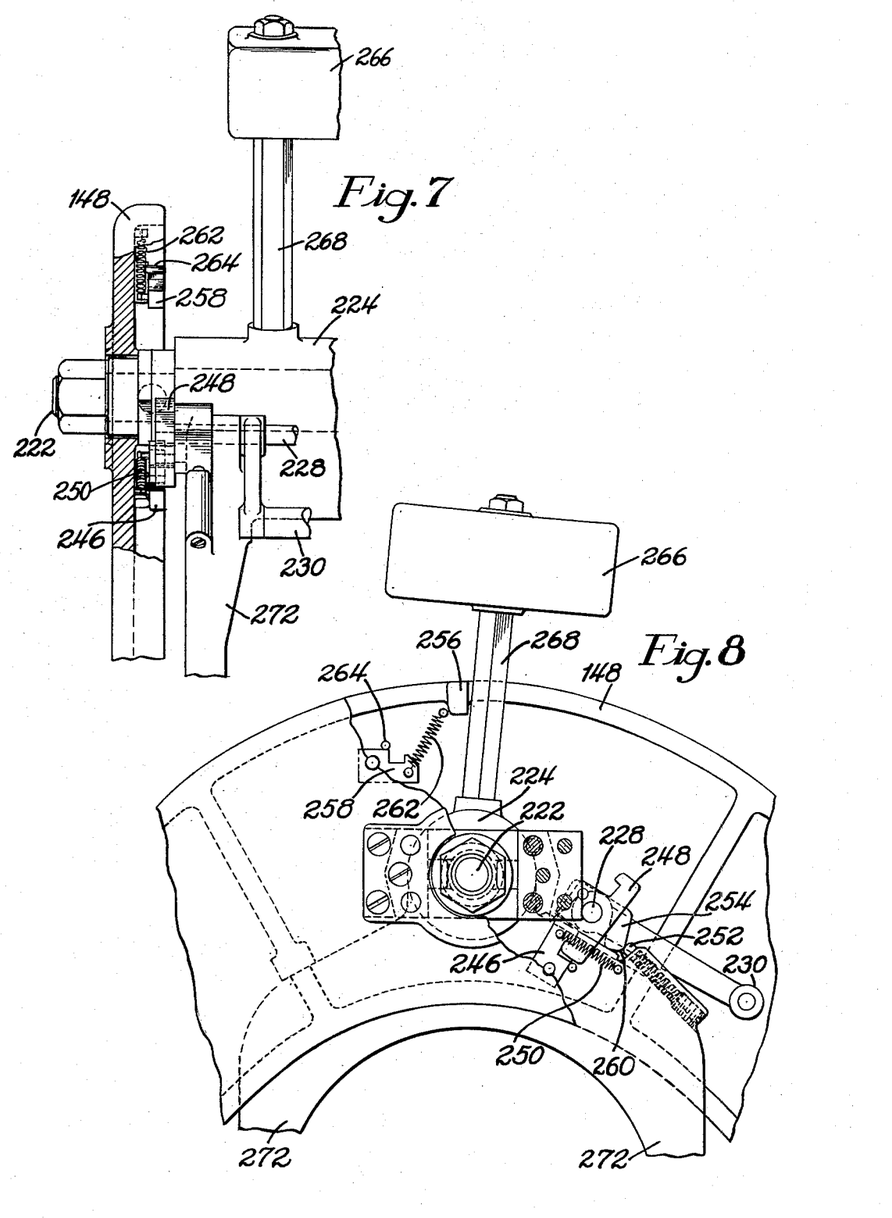
FIG. 7 is an enlarged view in front elevation illustrating certain parts in the head of the machine.
FIG. 8 is a left side elevation of the mechanism shown in FIG. 7.
Figure 9:
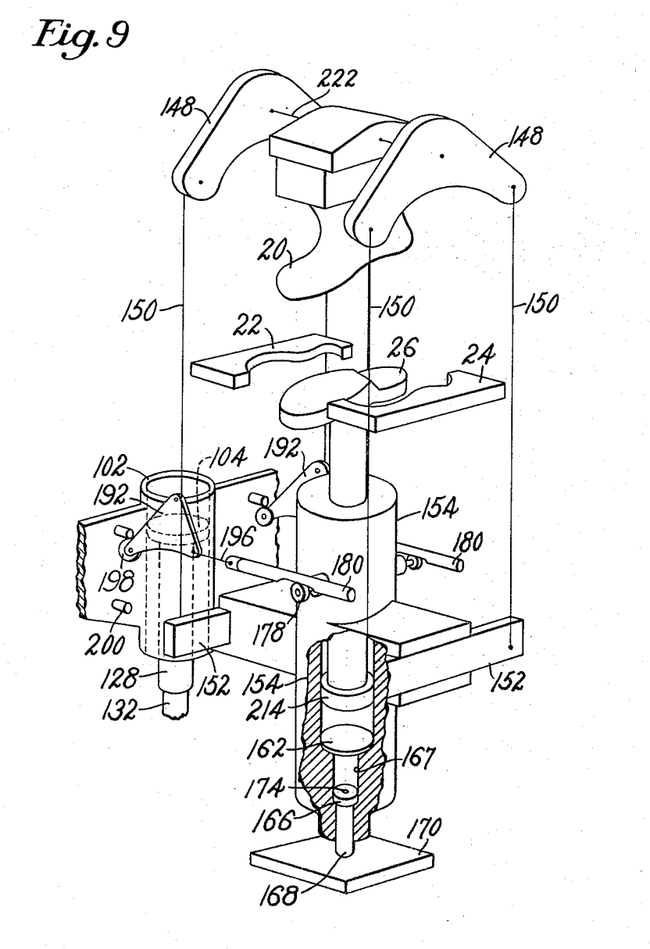
FIG. 9 is a schematic view in perspective illustrating the principal features of the machine.

To facilitate the removal of a shoe with a sole vulcanized thereon from the shoe form 20 the form may be swung forwardly toward the operator into a loading station in which the shoe form is conveniently positioned for the removal of the shoe therefrom and for the mounting thereon of a lasted shoe onto which a sole is to be vulcanized. To provide for such movement of the shoe form, the side frames 148 in each station of the machine are interconnected by tie rods 222 (FIG. 1) which serve as shafts for mounting each shoe form assembly. Journaled on each rod 222 is the hub 224 of a shoe form carrier identified generally by the numeral 226. Mounted on a spindle 228 carried by the hub 224 is a handle 230 whereby the operator may manipulate the carrier. Referring to FIGS. 1 and 2, which show one shoe form in its loading station, said form is shown broken to facilitate the mounting of a shoe thereon. The illustrated shoe form is provided with a heel member 232 having a concave surface 234 shaped complementally to a convex surface 236 of a forepart member 238 on which the heel member is carried. The heel member is positioned between arms 240 and 242 which provide a carrier therefor, and said arms are equipped with a handle 244 whereby the operator may swing the arms in a counterclockwise direction as seen in FIG. 2 to swing the heel member 232 toward the toe end of the forepart member 238 and into confronting relation to the tread face of the forepart member. In its downwardly depending position, the straightened shoe form is locked to prevent relative movement of the members 232 and 238 by a pawl 246 (FIG. 7) constructed and arranged to engage one end of a double ended latch member 248. The pawl 246 is pivotally mounted on the inner side frame 148 and is urged into latching engagement with the latch member 248 by a spring 250. The latch member 248 is held in latching engagement with the pawl 246 by a spring pressed pin 252 mounted in a bore in an extension of the hub 244 and arranged to press against an extension 254 of the latch member. When the operator grasps the handle 230 to swing the shoe form from its intermediate station to its loading station, the handle operates first to unlatch the latching elements by a counterclockwise movement as seen in FIG. 8 about the spindle 228. Continued movement of the handle 230 swings the shoe form assembly upon the rod 222 to move the shoe form into its loading station, this position of the shoe form being determined by the engagement of an extension of the hub 224 with a boss 256 projecting from the inner side frame 148. The shoe form assembly is locked in the loading station by the engagement of the double ended latch member 248 with a pawl 258 similar to the pawl 246. The latch member 248 is held in latching engagement with the pawl 258 by the action of the spring-pressed pin 252 against an angular surface 260 of the extension 254 of the latch member. The pawl 258 is urged into latching engagement with the latch member 248 by a suitable spring 262, the pawl 258 being positioned to receive the latch member 248 by a stop pin 264. In the illustrated shoe form assembly the weight of the shoe form is counterbalanced by a suitable weight member or block 266 secured to the outer ends of rods 268 mounted in and extending radially from the hub 224.

The operation of the illustrated machine will now be described. A bank of machines of the type herein illustrated may be arranged for operation by one operator and to that end the machine is so constructed that an independent hydraulic unit supplies pressure fluid to the hydraulic circuits of each machine in the bank. When any given machine is pressurized the side frames 148 supporting the shoe forms 20 are elevated by pressure upwardly against the plate 162 in the cylinder 154 as hereinbefore described.

Referring now to the cycle of operations, a lasted shoe having been mounted on a shoe form 20 in the loading station and a charge of vulcanizable material having been placed on the bottom mold member 26 within the walls of the containers 216 the operator swings the shoe forms downwardly into their intermediate stations by grasping the handle 230 in each station, first operating the handle to release the latch member 248 from the pawl 258 by swinging the handle about the spindle 228 and then continuing the movement of the handles to swing the shoe form assemblies downwardly to advance the forms into their intermediate stations, the position of each shoe form in the intermediate station being determined by the engagement of the latch member 248 with the pawl 246.

The operator then initiates the automatic cycle of the machine by pressing the starter button (not shown) in an electrical circuit, said starter button being conveniently mounted between the two stations of the machine. The operation of the starter button energizes a solenoid which opens a valve to cause pressure fluid to elevate the cylinder 102 which operates through means hereinbefore described to close the side mold members in both stations of the machine. At the proper time in the machine cycle the lug 200 projecting from the cylinder 102 engages the roll 198 carried by the bell crank lever 192 and actuates the lever to move the cam slide 180 outwardly thereby to move the ram cylinders 154 downwardly against the force of the pressure fluid in the chamber 167. Such downward movement is timed to occur as the side mold members 22 and 24 approach their closed positions so that the welt plates 146 engage the shoe upper as the shoe form moves downwardly and act as wipers to wipe the upper upwardly on the shoe form. Such wiping movement brings the insole firmly against the bottom or sole portion of the shoe form, particularly at the heel portion of the shoe where the insole tends to move away from the bottom of the shoe form.

The advancement of the side mold members is so timed that bosses 270 (FIG. 2) projecting upwardly from the mold carriers 30 and 32 move in under the extremities of two legs 272 extending downwardly from the hub 224, the upper surface of the bosses being spaced downwardly from the extremities of the legs only a few thousandths of an inch. As soon as the side mold members come to rest upon the completion of their closing movement fluid pressure in the chamber 167 is relieved and the shoe form moves downwardly to bring the legs 272 into engagement with the bosses 270, the shoe form now being located in the mold charging station. The rearmost of the bosses 270 have upstanding ribs 274 arranged to be received in grooves 276 formed in the extremities of the rear legs 272 thereby to position the legs positively relatively to the side mold carriers. In order to permit the shoe form to adapt itself to the position of the side mold members widthwise thereof, provision is made for limited widthwise movement of the shoe form on its carrier 226.

Upward movement of the shoe form relatively to the welt plates under the upward force exerted against the shoe bottom by the bottom mold member is prevented in the illustrated organization by the provision of means whereby each shoe form is connected to the cylinder 154. The illustrated connecting means comprises the side frames 148, the shafts 150 and the cross heads 152. It will be seen that in this organization upward pressure of the ram 158 to advance the bottom mold member 26 toward the shoe bottom is accompanied by an equivalent downward force exerted against the cylinder 154 acting through the connections above described to apply downward force to the shoe form. Inasmuch as the upward force is divided between the shoe bottom and the welt plates 146 whereas the entire downward force is imparted to the shoe form there is a differential force exerted downwardly against the shoe form. This differential force is taken by the legs 272 in the shoe form assembly which by their engagement with the side mold carriers 30 and 32 prevent downward dislocation of the shoe form from its mold charging station.

A further explanation of the reasons for providing a balance of forces between the bottom mold member and the shoe form is set forth in the Choice Patent No. 2,956,313 hereinbefore referred to.

Upon the completion of the sole vulcanizing operation the ram 158 moves downwardly to return the bottom mold member 26 to its rest position, and after the ram has moved downwardly sufficiently to relieve the pressure of the newly vulcanized sole against the welt plates 146 the side mold members 22 and 24 are retracted, and upon the completion of their retracting movement the shoe form 20 is elevated to its intermediate station as hereinbefore described. The shoe form is then manually swung into its loading station. Thereupon the shoe form is broken, the newly soled shoe is removed therefrom, a lasted shoe to which a sole is to be vulcanized is mounted on the heel member 232 and the shoe form is straightened to bring the shoe into assembled position thereon.

The illustrated machine has been described above with respect to the molding and vulcanizing of soles onto shoe bottoms by the application of relatively low pressure followed by the application of increased pressure, but it will be understood that by a suitable adjustment of the hydraulic controls, the vulcanizing procedure can be varied to meet the requirements of different shoemaking practices. Furthermore, if desired, the cycle of operations can be modified to cause the side mold members to complete their closing movement before the shoe form is moved downwardly from its intermediate station to its mold charging station.

Having thus described our invention, what we claim as new and desire to secure by Letters Patent of the United States is:

1. In a machine for molding soles onto shoe bottoms, a bottom mold member, a pair of side mold members movable into mold closing relation to the bottom mold member, a shoe form, a cylinder, connections from the cylinder for supporting the shoe form in its retracted position, a first piston mounted in the cylinder and operable to elevate the cylinder and the shoe form, a cam slide, a cam roll carried by the cylinder and arranged to limit its upward movement by engagement with the cam slide, and means for operating the cam slide to impart downward movement to the cylinder and through the cylinder to the shoe form.

2. In a machine for molding soles onto shoe bottoms, a bottom mold member, a pair of side mold members movable into mold closing relation to the bottom mold member, a shoe form for supporting a lasted shoe onto which a sole is to be molded, a first cylinder, connections from the first cylinder for supporting the shoe form in its retracted position, a first piston mounted in the first cylinder and operable to elevate the first cylinder and the shoe form, a cam roll carried by the first cylinder, a cam slide arranged to be engaged by the cam roll thereby to limit upward movement of the first cylinder, a second piston and cylinder assembly, means operated by said assembly to impart closing movements to the side mold members, means operated by said assembly to actuate the cam slide thereby to impart downward movement to the shoe form, and a second piston mounted in the first cylinder and operable to cause the bottom mold member to apply molding pressure to a charge mounted thereon.

3. In a machine for molding soles onto shoe bottoms, a bottom mold member, a pair of side mold members movable into mold closing relation to the bottom mold member, each side mold member having incorporated therein a weld plate whereby a marginal extension is formed in a molded sole, a shoe form for supporting a shoe assembly comprising an upper lasted to an insole onto which an outsole is to be molded, a first cylinder, connections from the first cylinder for supporting the shoe form in its retracted position, a first piston mounted in the first cylinder and operable to elevate the first cylinder and the shoe form, a cam roll carried by the first cylinder, a cam slide arranged to be engaged by the cam roll thereby to limit upward movement of the first cylinder, a second piston and cylinder assembly, means operated by said assembly to impart closing movements to the side mold members, means operated by said assembly to actuate the cam slide thereby to impart downward movement to the shoe form, at least a part of such downward movement occurring while the welt plates are in contact with the upper so that the upper is upwiped to bring the insole into contiguous relation to the sole face of the shoe form throughout its entire extent, and a second piston mounted in the first cylinder and operable to cause the bottom mold member to apply molding pressure to a charge mounted thereon.

4. In a machine for molding soles onto shoe bottoms, a bottom mold member, a pair of side mold members movable into mold closing relation to the bottom mold member, said bottom mold member being arranged to receive and support a charge of moldable material, and means cooperating with the bottom mold member only when it and the side mold members are retracted to confine the charge to the area of the charge supporting surface of the bottom mold member.

5. In a machine for molding soles onto shoe bottoms, a bottom mold member, a pair of side mold members movable into mold closing relation to the bottom mold member, said bottom mold member being arranged to receive and to support a charge of moldable material, and means surrounding the bottom mold member in contiguous relation thereto only when it and the side mold members are retracted thereby to confine the charge to the area of the charge supporting surface of the bottom mold member.

6. In a machine for molding soles onto shoe bottoms, a bottom mold member, a pair of side mold members movable into mold closing relation to the bottom mold member, a shoe form for supporting a lasted shoe onto which a sole is to be molded, a first cylinder, connections from the first cylinder for supporting the shoe form in its retracted position, a first piston mounted in the first cylinder and operable to elevate the first cylinder and the shoe form, a cam roll carried by the first cylinder, a cam slide arranged to be engaged by the cam roll thereby to limit upward movement of the first cylinder, a second piston and cylinder assembly, means whereby said second piston and cylinder assembly is supported by the side mold members, and means whereby said second piston and cylinder assembly imparts closing movement to the side mold members.

References Cited by the Examiner
UNITED STATES PATENTS

| | | | |
|---|---|---|---|
| 2,922,191 | 1/60 | Barton | 18—17 |
| 3,012,278 | 12/61 | Szerszynski | 18—17 |
| 3,016,569 | 1/62 | Bingham et al. | 18—17 |
| 3,018,517 | 1/62 | Ludwig | 18—17 |
| 3,048,893 | 8/62 | Choice | 18—17 |
| 3,063,096 | 11/62 | Hardy | 18—17 |

MICHAEL V. BRINDISI, *Primary Examiner.*